United States Patent
Chaudhri et al.

(10) Patent No.: US 11,797,934 B2
(45) Date of Patent: *Oct. 24, 2023

(54) AVOIDING A REDUNDANT DISPLAY OF A NOTIFICATION ON MULTIPLE USER DEVICES

(71) Applicant: Apple Inc., Cupertino, CA (US)

(72) Inventors: Imran Chaudhri, San Francisco, CA (US); Stephen Lemay, Palo Alto, CA (US); Elizabeth Caroline Furches Cranfill, San Francisco, CA (US); Ron Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,509

(22) Filed: Mar. 18, 2022

(65) Prior Publication Data

US 2022/0270045 A1     Aug. 25, 2022

Related U.S. Application Data

(63) Continuation of application No. 16/238,186, filed on Jan. 2, 2019, now Pat. No. 11,282,032, which is a (Continued)

(51) Int. Cl.
*G06Q 10/10*     (2023.01)
(52) U.S. Cl.
CPC .................................. *G06Q 10/10* (2013.01)
(58) Field of Classification Search
CPC . G06Q 10/10; H04W 4/50; G06F 9/52; G06F 16/958; G06F 9/542; G06F 3/14; G06F 9/44; G06F 15/16
See application file for complete search history.

(56) References Cited

U.S. PATENT DOCUMENTS 7,305,069 B1 *  12/2007  Day .................. H04M 3/53333
                                                                    709/227
8,024,415 B2     9/2011  Horvitz
(Continued)

FOREIGN PATENT DOCUMENTS

CN     1221912 C     10/2005
CN     101257375 A    9/2008
(Continued)

OTHER PUBLICATIONS

Baidu Knows, "In the group setting in QQ, what is the difference between 'only display the number of messages when a message comes' and 'received but not prompt messages,'" Retrieved from the Internet: URL: https://zhidao.baidu.com/question/16825415.html [Retrieved on Mar. 17, 2021].

*Primary Examiner* — Kevin T Bates
*Assistant Examiner* — Ranjan Pant
(74) *Attorney, Agent, or Firm* — Blank Rome LLP

(57) ABSTRACT

A user having multiple electronic devices may receive notifications at each of the devices. When it is determined that a first device is in an active state and that a notification has been viewed on that device, an indication that the notification has been viewed may be communicated by the first device to a synchronization server. It may then be determined whether the viewed notification is also present on one or more of the user's other devices. Based on the determination, an indication that the notification has been viewed may be sent from the synchronization server to each of the user's devices on which the notification is present. Upon receipt of the indication from the synchronization server, the viewed notification may be removed from each of the devices, thereby avoiding a redundant display of the notification on multiple devices.

20 Claims, 8 Drawing Sheets

Related U.S. Application Data continuation of application No. 13/485,221, filed on May 31, 2012, now Pat. No. 10,210,480.

(56) References Cited

U.S. PATENT DOCUMENTS

| | | |
|---|---|---|
| 8,346,868 B2 | 1/2013 | Nakajima |
| 8,350,694 B1 | 1/2013 | Trundle |
| 8,392,543 B1 | 3/2013 | Singh |
| 8,527,602 B1 | 9/2013 | Rasmussen |
| 8,559,924 B1 | 10/2013 | Henderson |
| 8,739,249 B1 | 5/2014 | Kay |
| 8,799,406 B1 | 8/2014 | Slonh |
| 8,858,313 B1 | 10/2014 | Selfors |
| 2002/0138582 A1 | 9/2002 | Chandra |
| 2002/0169826 A1 | 11/2002 | Yano |
| 2004/0143636 A1 | 7/2004 | Horvitz |
| 2005/0033803 A1 | 2/2005 | Vleet |
| 2005/0097441 A1 | 5/2005 | Herbach |
| 2006/0015763 A1 | 1/2006 | Nakajima |
| 2006/0031587 A1 | 2/2006 | Paterson |
| 2006/0041603 A1 | 2/2006 | Paterson |
| 2006/0150175 A1 | 7/2006 | Etelapera |
| 2006/0282851 A1 | 12/2006 | Errico |
| 2007/0143435 A1 | 6/2007 | Daigle |
| 2007/0285390 A1 | 12/2007 | Yee |
| 2007/0287376 A1 | 12/2007 | Pall |
| 2008/0005238 A1 | 1/2008 | Hall |
| 2008/0059656 A1 | 3/2008 | Saliba |
| 2008/0095336 A1 | 4/2008 | Tysowski |
| 2008/0120362 A1 | 5/2008 | Kapoor |
| 2009/0031006 A1* | 1/2009 | Johnson ............ H04M 3/42348 709/218 |
| 2009/0106382 A1 | 4/2009 | Arellano |
| 2009/0106455 A1 | 4/2009 | Xu |
| 2009/0172201 A1 | 7/2009 | Carmel |
| 2009/0175509 A1 | 7/2009 | Gonion |
| 2009/0177783 A1 | 7/2009 | Adler |
| 2009/0198779 A1 | 8/2009 | Agrawal |
| 2009/0228606 A1 | 9/2009 | Mccarthy |
| 2009/0248806 A1 | 10/2009 | Teman |
| 2009/0254601 A1 | 10/2009 | Moeller |
| 2009/0282125 A1 | 11/2009 | Jeide |
| 2009/0307284 A1 | 12/2009 | Welingkar |
| 2010/0023533 A1 | 1/2010 | Celi |
| 2010/0061636 A1 | 3/2010 | Fukushima |
| 2010/0088316 A1 | 4/2010 | Robinson |
| 2010/0107164 A1 | 4/2010 | Koskimies |
| 2010/0153410 A1 | 6/2010 | Jin |
| 2010/0241700 A1 | 9/2010 | Rasmussen |
| 2010/0257451 A1 | 10/2010 | Halevi |
| 2010/0262922 A1 | 10/2010 | Fan |
| 2010/0299306 A1 | 11/2010 | Agetsuma |
| 2010/0332682 A1 | 12/2010 | Sharp |
| 2011/0010629 A1 | 1/2011 | Castro |
| 2011/0026704 A1 | 2/2011 | Connelly |
| 2011/0047033 A1 | 2/2011 | Mahaffey |
| 2011/0102459 A1* | 5/2011 | Hall ...................... A63F 13/10 345/633 |
| 2011/0125769 A1 | 5/2011 | Rodrigues |
| 2011/0153745 A1 | 6/2011 | Limont |
| 2011/0191431 A1 | 8/2011 | Noguchi |
| 2011/0202588 A1 | 8/2011 | Aggarwal |
| 2011/0202956 A1 | 8/2011 | Connelly |
| 2011/0231308 A1* | 9/2011 | Rodkey ................ G06Q 40/02 705/35 |
| 2011/0239135 A1 | 9/2011 | Spataro |
| 2011/0295889 A1* | 12/2011 | Xu ..................... G06Q 10/10 707/E17.014 |
| 2011/0321081 A1 | 12/2011 | Lee |
| 2012/0005283 A1 | 1/2012 | Provo |
| 2012/0030050 A1 | 2/2012 | Rey |
| 2012/0047214 A1 | 2/2012 | Daly |
| 2012/0084466 A1 | 4/2012 | Brown |
| 2012/0110595 A1 | 5/2012 | Reitman |
| 2012/0117105 A1 | 5/2012 | Thomas |
| 2012/0131083 A1 | 5/2012 | Goddard |
| 2012/0131150 A1 | 5/2012 | Jeong |
| 2012/0144123 A1 | 6/2012 | Aronovich |
| 2012/0149342 A1 | 6/2012 | Cohen |
| 2012/0188147 A1 | 7/2012 | Hosein |
| 2012/0191799 A1 | 7/2012 | Pattan |
| 2012/0192086 A1 | 7/2012 | Ghods |
| 2012/0278475 A1 | 11/2012 | Papakipos |
| 2012/0311043 A1 | 12/2012 | Chen |
| 2012/0330887 A1 | 12/2012 | Young |
| 2013/0018945 A1 | 1/2013 | Vendrow |
| 2013/0041959 A1 | 2/2013 | Bengtsson |
| 2013/0047034 A1 | 2/2013 | Salomon |
| 2013/0067035 A1 | 3/2013 | Amanat |
| 2013/0086153 A1 | 4/2013 | Vendrow |
| 2013/0117383 A1 | 5/2013 | Hymel |
| 2013/0124638 A1 | 5/2013 | Barreto |
| 2013/0132573 A1 | 5/2013 | Lindblom |
| 2013/0151636 A1 | 6/2013 | Majeti |
| 2013/0151690 A1 | 6/2013 | Shah |
| 2013/0166673 A1 | 6/2013 | Elango |
| 2013/0173742 A1 | 7/2013 | Thomas |
| 2013/0194172 A1 | 8/2013 | Shyamalan |
| 2013/0222236 A1 | 8/2013 | Gardenfors |
| 2014/0101654 A1 | 4/2014 | Chang |
| 2015/0195221 A1 | 7/2015 | Rasmussen |
| 2015/0220131 A1 | 8/2015 | Johansson |
| 2016/0004410 A1 | 1/2016 | Srinivasan |

FOREIGN PATENT DOCUMENTS

| | | |
|---|---|---|
| CN | 102282872 A | 12/2011 |
| CN | 102365841 A | 2/2012 |
| JP | H09008842 A | 1/1997 |
| JP | 2001056704 A | 2/2001 |
| JP | 2001290737 A | 10/2001 |
| JP | 2002132632 A | 5/2002 |
| JP | 2007102301 A | 4/2007 |

* cited by examiner

AVOIDING A REDUNDANT DISPLAY OF A NOTIFICATION ON MULTIPLE USER DEVICES

BACKGROUND

This disclosure relates generally to the management of notifications that are presented on multiple devices of a user.

It has become common for people to use multiple electronic devices. For example, a single user may use a mobile phone, tablet computer device, laptop computer system, and desktop computer system during a typical day. It has also become increasingly common for there to be an overlap in the manner in which these devices are used. While mobile devices such as mobile phones and portable music devices were at one time used for very specific purposes, the increased functionality, processing capabilities, and connectivity of these devices has enabled them to be used in many of the same ways as a laptop or desktop computer system.

Because a user may switch between devices throughout the day, each device may be set up similarly to allow the user to receive the same types of information through each device. For example, a user may set up each of their devices to retrieve information such as email, weather updates, sports updates, and social network messages. Based on the multiple sources from which this information is received, each device may also be set up to consolidate information such that the user can view information from the multiple sources through a single interface. In such an arrangement, information received by applications running on a device may generate notifications that are presented through a single notification interface. Therefore, a user may be able to easily switch between devices and view information that is of interest to them. Each device may continue to receive information and generate notifications even when the device is in an inactive state (i.e., not in active use by the user). Therefore, upon activation, a device may display all of the new notifications that have been generated since the last time the device was used. Based on the overlap in the manner in which the devices are used, it may be cumbersome for a user to sift through overlapping notifications that they have already viewed on another device.

SUMMARY

In one embodiment, a program storage device may include instructions to cause a processor to receive, at a server computer system, an indication that a notification has been viewed on a first device of a user. In response to the indication, one or more of the user's additional devices may be identified and an indication that the notification has been viewed on the first device may be sent to the additional device(s).

In another embodiment, a method includes receiving a notification at a first device of multiple associated devices. If it is subsequently determined that the first device is in an active state and that the notification has been viewed on the first device, an indication that the notification has been viewed on the first device and should be removed from any of the associated devices may be sent by the first device.

In still another embodiment, a program storage device may include instructions to cause a processor to receive multiple messages from multiple sources at a first device associated with multiple additional devices. Based on the multiple messages, multiple notifications may be generated by the first device to be displayed through a common interface of the first device. If it is determined that the first device is in an active state and that one of the notifications has been viewed on the first device, an indication that the notification has been viewed on the first device may be sent from the first device to a synchronization server computer system.

DETAILED DESCRIPTION

This disclosure pertains to the management of notifications that are received at multiple user devices. In general, techniques are disclosed for identifying an active device of a user, determining that the user has viewed a notification on the active device, and removing the notification from one or more other devices of the user to avoid redundant displays of the same notification.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of synchronization services having the benefit of this disclosure.

Figure 1:
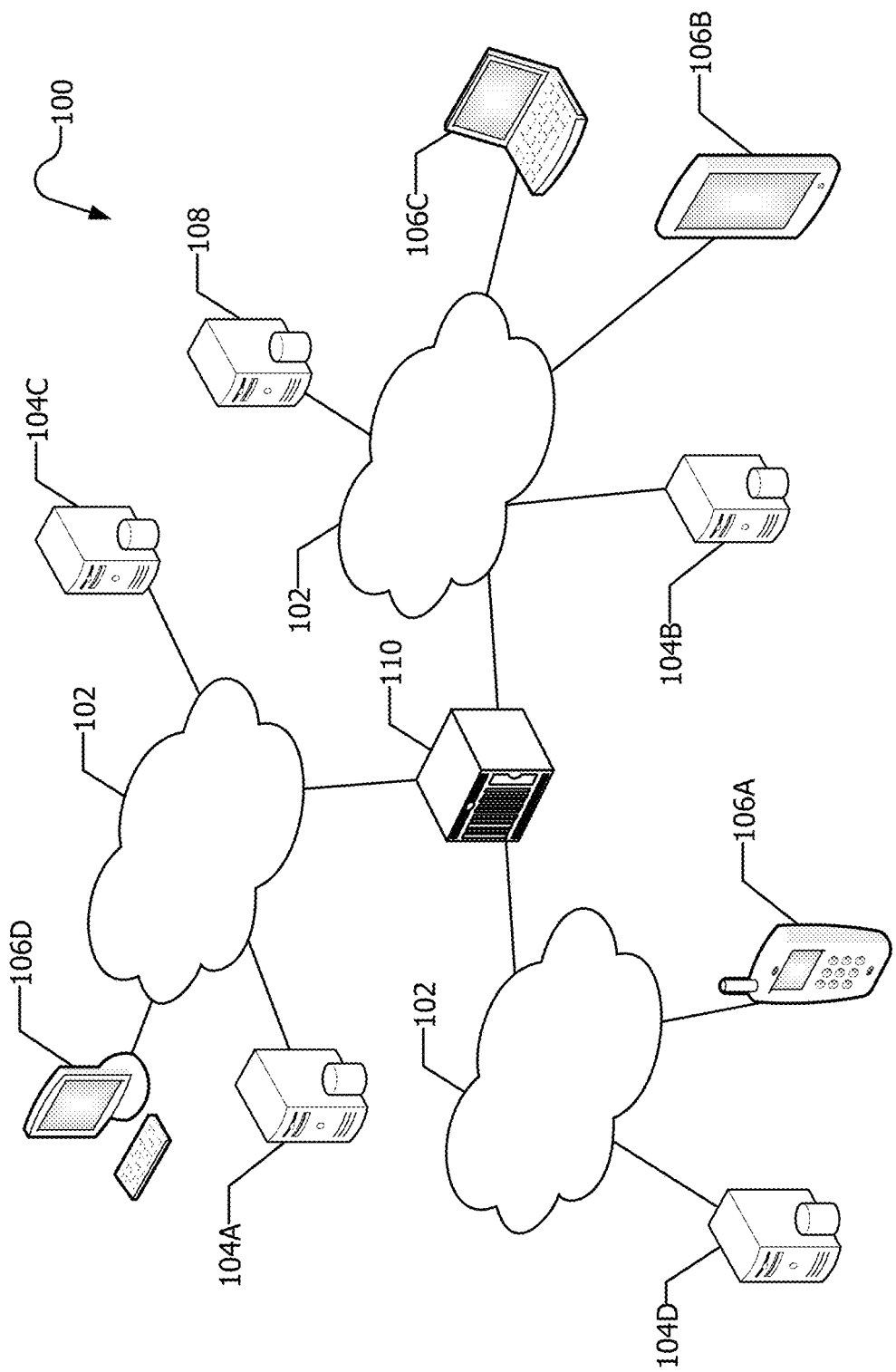
FIG. 1 is a block diagram of a network architecture in accordance with one embodiment.

FIG. 1 illustrates network architecture 100 in accordance with one embodiment. As shown, a plurality of networks 102 may be provided. In the context of network architecture 100, networks 102 may take any form including, but not limited to, a local area network (LAN), a wide area network (WAN) such as the Internet or a combination of local and wide-area networks. Further, networks 102 may use any desired technology (wired, wireless or a combination thereof) and protocol (e.g., transmission control protocol, TCP).

Coupled to networks 102 are data server computers 104 which are capable of communicating over networks 102. In the illustrated embodiment, data server 104A may represent one or more social network servers (e.g., web servers that host a social network application), data server 104B may represent one or more sports servers (e.g., web servers that host a sports application), data server 104C may represent one or more email servers (e.g., web servers that host an email application), and data server 104D may represent one or more weather servers (e.g., web servers that host a weather application). The listed applications running on data servers 104A-104D are intended to provide an example of the applications that can be hosted by such servers and are not intended to be limiting in any manner. It will be recognized that data servers 104 can host numerous different types of applications beyond the illustrative four shown in FIG. 1.

Also coupled to networks 102 may be a plurality of end user devices 106. In the illustrated embodiment, end user devices 106 represent example devices belonging to a single user. For example, a user may use mobile phone 106A, tablet device 106B, laptop computer system 106C, and desktop computer system 106D. The illustrated devices are intended to provide an example of the devices that a typical user may possess and are not intended to be limiting in any manner. Additional or substitute devices of a user may include a personal digital assistant (PDA), personal music player, e-book reader, television, and/or any other electronic device capable of communicating via networks 102. End user devices 106 may interact with data servers 104. For example, end user devices 106 may send and receive social network messages via a social network application running on social network server 104A, receive sports updates via a sports application running on sports server 104B, send and receive email messages and/or calendar appointments via an email application running on email server 104C, and receive weather updates via a weather application running on weather server 104D. In a typical arrangement, each user device 106 may have installed thereon a client-side application that interfaces with the server-side application that runs on the server. For example, a client-side social network application running on device 106 may interface with a server-side social network application running on social network server 104A to provide functionality associated with a social network account.

Also coupled to networks 102 may be a synchronization server 108. Synchronization server 108 may take the form of data server 104 but may provide a service that maintains synchronization between a user's devices 106 that are registered for the service. One example of a synchronization service is the Apple® iCloud™ service. (APPLE is a registered trademark of Apple Inc. ICLOUD is a trademark of Apple Inc.) The functionality of a synchronization service executing on synchronization server 108 will be described in greater detail below. In order to facilitate communication among networks 102, at least one gateway or router 110 is optionally coupled there between.

Figure 2:
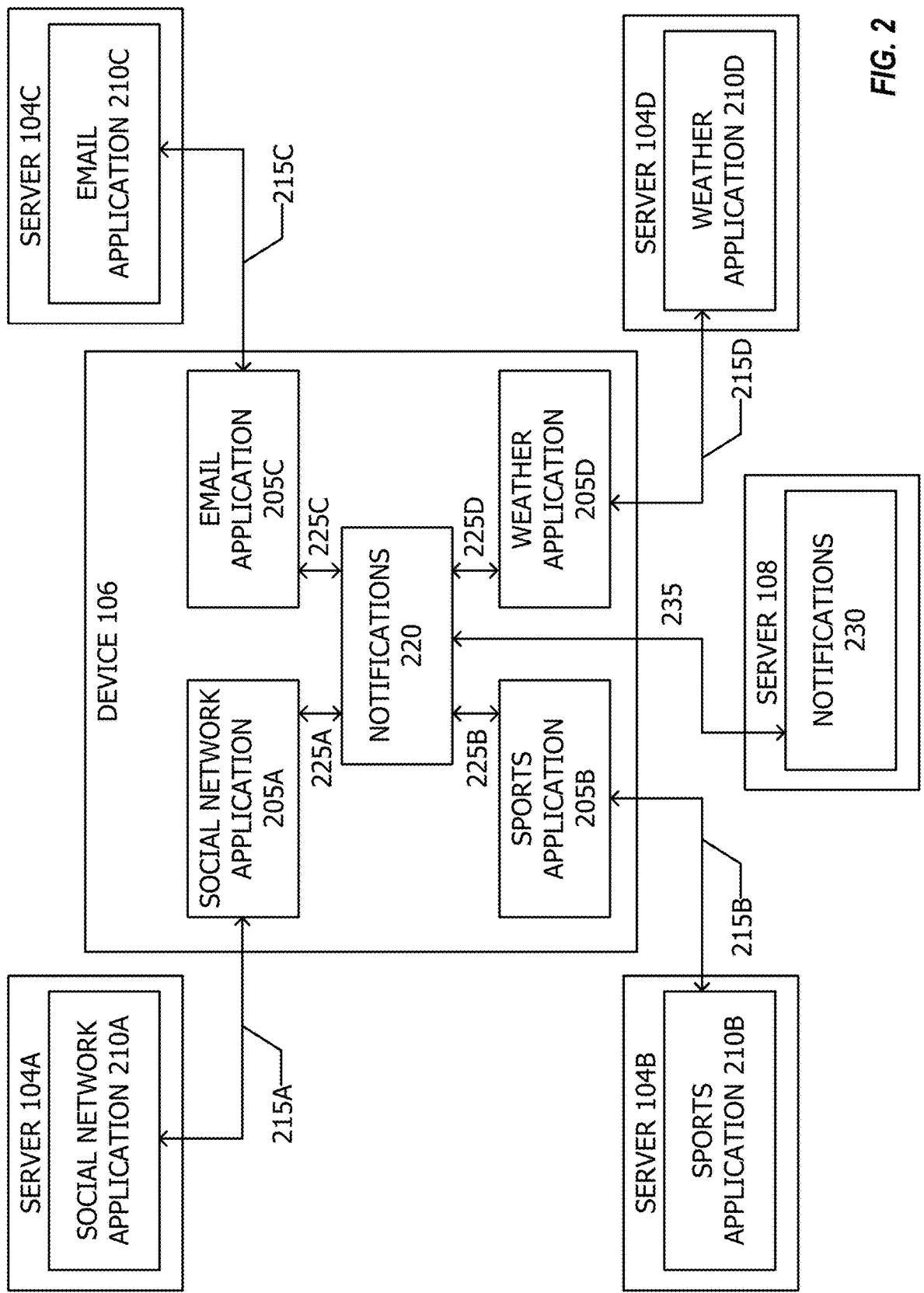
FIG. 2 is a block diagram illustrating the consolidation of information obtained from multiple sources into a single notification service in accordance with one embodiment.

FIG. 2 illustrates the interaction between several client-side applications executing on one of user devices 106 and server-side applications executing on several data servers 104 to provide notifications to a user of device 106. As illustrated, client-side social network application 205A interfaces via communication link 215A (e.g., a communication link over networks 102) with server-side social network application 210A executing on server 104A to send and receive social network messages. For example, a user of device 106 may communicate a social network message to social network friends, update their social network status, and/or receive social network messages sent by social network friends via client-side social network application 205A. Similarly, device 106 may receive sports updates via link 215B between client-side sports application 205B and server-side sports application 210B executing on server 104B, send and receive emails via link 215C between client-side email application 205C and server-side email application 210C executing on server 104C, and receive weather updates and forecasts via link 215D between client-side weather application 205D and server-side weather application 210D executing on server 104D. In one embodiment, new information may be pushed from a server-side application to a client-side application executing on device 106 as the information is received at the server-side application. In another embodiment, information may be pulled from a server-side application by the client-side application at a particular frequency. For example, a client-side application may request updated information from the server-side application every 30 minutes. In one embodiment, the update frequency may be a selectable setting of the client-side application. In another embodiment, retrieval of information may occur regardless of the state of the device. For example, even if device 106 is in an inactive state (i.e., not in active use by the user of the device), the client-side applications may continue to request and receive updated information.

Rather than receiving information from each of the client-side applications executing on device 106 through separate interfaces (e.g., an interface of the client-side application), the user may choose to consolidate information received through these client-side applications through client-side notification service 220. Client-side notification service 220 may execute on device 106 as either a user-level application or as an operating system service. A user of device 106 may choose to receive information that is retrieved by one or more client-side applications executing on device 106 as a notification through a common interface of client-side notification service 220. In the illustrated embodiment, the user of device 106 has linked each of client-side social network application 205A, client-side sports application 205B, client-side email application 205C, and client-side weather application 205D to client-side notification service 220. In one embodiment, each message received by any of these client-side applications will be passed to client-side notification service 220. In another embodiment, the user may define (through a setting of either the client-side application or the client-side notification service) a subset of the messages that are received by the client-side application that should be presented as notifications through notification service 220. For example, a user may not want to see a notification each time a social network friend updates their status or comments on another social network message but may want to see all original social network messages communicated by social network friends. Similarly, the user may only want to receive notifications for sports updates for a particular team or weather updates for a particular location.

Therefore, client-side notification service 220 may provide a single interface through which the user of device 106 can quickly view the information that is of most interest to them.

Based on the appropriate settings, information that is received at each of the client-side applications that is linked to client-side notification service 220 is communicated to notification service 220 as indicated by arrows 225A-225D. In one embodiment, information is supplied to notification service 220 upon receipt of the information by a client-side application. In another embodiment, notification service 220 may request updated information from each of the linked client-side applications at a certain frequency. For example, notification service 220 may request new information from each of the linked client-side applications every 10 minutes. In one embodiment, the update frequency may be a selectable setting of notification service 220. As mentioned above, information may be retrieved by client-side applications even when device 106 is in an inactive state. Similarly, the retrieved information may be passed to notification service 220 even when device 206 is in an inactive state. As such, notifications may accumulate in notification service 220 when device 106 is not in use.

Moreover, as will be described in greater detail below, a user may install one or more of the same client-side applications on multiple devices and may link the client-side applications with notification service 220 on the multiple devices. Therefore, there may be an overlap in the notifications that are presented on the multiple devices. For example, client-side social network application 205A executing on mobile phone 106A may retrieve the same information from server-side social network application 210A as does client-side social network application 205A executing on laptop 106C. In order to manage the notifications that are present in notification service 220 on each of the user's devices, client-side notification service 220 may be linked to server-side notification service 230 executing on synchronization server 108.

In one embodiment, synchronization server 108 may provide a user account through which information can be shared between multiple devices. For example, synchronization server 108 may provide data storage and may allow each of the devices associated with a user account to retrieve data from the storage. In one embodiment, server-side notification service 230 may be one of the features offered through a user account with synchronization server 108. In another embodiment, a user account at synchronization server 108 may maintain a record of each of the user's devices 106 and, more specifically, may maintain a record of each of the user's devices 106 that executes client-side notification service 220. Each time a notification is received at client-side notification service 220, the notification may be shared with server-side notification service 230 by communicating the notification over networks 102 as illustrated by communication link 235. Thus, server-side notification service 230 may maintain a record of each notification that is present for each of the user's devices.

Figure 3:
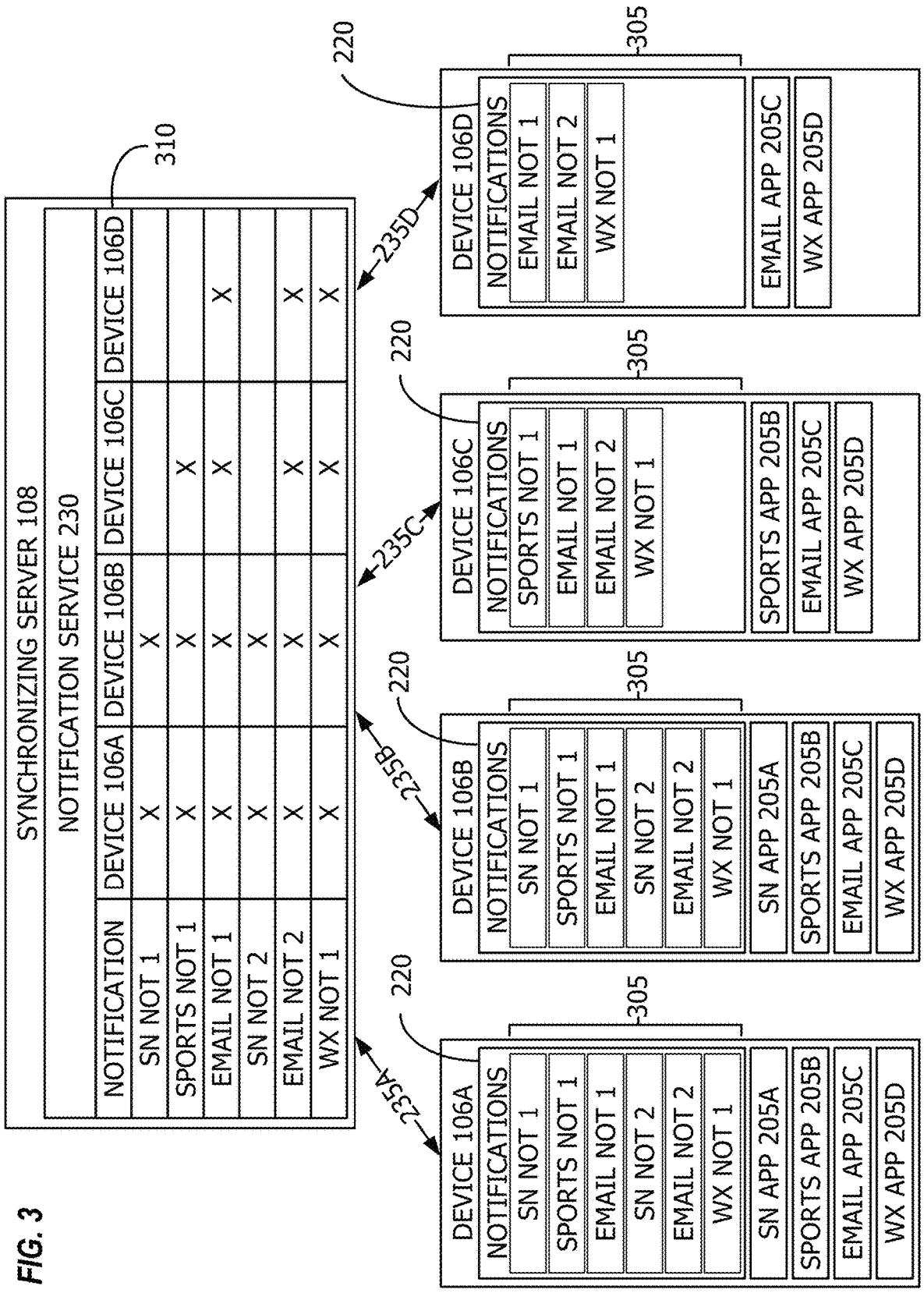
FIG. 3 is a block diagram illustrating the synchronization of active notifications on each of multiple user devices by a server-side notification service in accordance with one embodiment.

Referring to FIG. 3, a block diagram illustrates records of the active notifications at multiple user devices (106A-106D) maintained by server-side notification service 230 executing on synchronization server 108. Devices 106A-106D include overlapping client-side applications. To continue the example of FIGS. 1 and 2, client-side email application 205C and client-side weather application 205D are installed on each of devices 106A-106D. Client-side sports application 205B may be installed on mobile phone 106A, tablet device 106B, and laptop computer system 106C but not on desktop computer system 106D. Client-side social network application 205A may be installed on mobile phone 106A and tablet device 106B but not on laptop computer system 106C or desktop computer system 106D. Each of devices 106A-106D executes client-side notification service 220 to retrieve information from the installed client-side applications and present the information to the user through a single interface.

In the illustrated embodiment, the user has linked each of the client-side applications installed on each device to client-side notification service 220. Therefore, information received by the installed client-side applications may be presented as notifications 305 through client-side notification service 220 on each of devices 106A-106D.

In the illustrated embodiment, notifications 305 may be displayed through notification service 220 in the order in which the notifications are received. In one embodiment, this order may be based on a timestamp associated with the original information received from the server-side application. In another embodiment, the order may be based on the order in which the notifications are received by notification service 220. In another embodiment, notifications may be sorted based on the client-side application that generated the notification. In such an embodiment, the order in which the client-side applications are sorted may be selectable by the user.

In the illustrated embodiment, two social network notifications (SN NOT 1 and SN NOT 2) are received in notification service 220 from client-side social network application 205A, one sports notification (SPORTS NOT 1) is received in notification service 220 from client-side sports application 205B, two email notifications (EMAIL NOT 1 and EMAIL NOT 2) are received in notification service 220 from client-side email application 205C, and one weather notification (WX NOT 1) is received in notification service 220 from client-side weather application 205D.

Client-side notification service 220 may only receive notifications corresponding to the client-side applications that are installed on the device. For example, client-side notification service 220 executing on mobile phone 106A may display each of the above-mentioned notifications because each of client-side applications 205A-D is installed on mobile phone 106A. In contrast, client-side notification service 220 executing on desktop computer 106D may display only email and weather notifications because only client-side email application 205C and client-side weather application 205D are installed on desktop computer 106D.

While the illustrated embodiment indicates that the notifications received by client-side notification service 220 are directly tied to the client-side applications that are installed on the device, this is not necessarily the case. For example, for a particular client-side application that is installed on a first device and a second device, the user may wish to receive notifications on the first device but not on the second device. Therefore, the user may link the client-side application with client-side notification service 220 on the first device but not on the second device. Similarly, the user may link the client-side application with client-side notification service 220 on both devices but may use different settings such that the first device may display all messages from the client-side application as notifications through client-side notification service 220 while the second device displays only a subset of those notifications.

Client-side notification service 220 on each of devices 106A-D may communicate notifications 305 to server-side notification service 230 executing on synchronization server 108 over networks 102 as illustrated by communication links 235A-D. In one embodiment, communication of a notification may occur upon receipt of the new notification by client-side notification service 220. In another embodiment, communication of notifications may occur according to a certain frequency. For example, client-side notification service 220 may transmit any new notification information to server-side notification service 230 every 5 minutes. In one embodiment, client-side notification service 220 may include account credentials in any communication to synchronization server 108. These credentials may allow synchronization server 108 to identify a user account and the devices associated with the user's account.

In one embodiment, the actual notification may be transmitted from client-side notification service 220 to server-side notification service 230. That is, the actual data that constitutes the notification may be transmitted from client-side notification service 220 to server-side notification service 230. In another embodiment, an identifier of the notification may be transmitted from client-side notification service 220 to server-side notification service 230. For example, a hash algorithm may be applied to the notification and the resulting hash value may be sent to server-side notification service 230. In such an embodiment, each of devices 106A-D may perform the same hash algorithm such that server-side notification service 230 recognizes the resulting hash as constituting the same notification from each of the devices.

Based on the received notifications (and/or notification identifiers), server-side notification service 230 may maintain data store 310 to track the notifications that are present on each of the user's devices. In one embodiment, data store 310 may maintain a list of any active notifications present on any of the user's registered devices. For each active notification, data store 310 may also indicate on which of the user's devices the notification is present. As illustrated, redundant notifications may accumulate on each of the user's devices. Moreover, as noted above, notifications may continue to accumulate even when a device is in an inactive state. Therefore, a user that utilizes mobile phone 106A to communicate during the day and utilizes desktop computer 106D to communicate during the evening may view several notifications on mobile phone 106A during the day but may have to sift through the very same notifications (that accumulated while desktop computer 106D was inactive) when they transition to desktop computer system 106D in the evening. In one embodiment, the linkage between client-side notification service 220 and server-side notification service 230 for each of the user's devices may avoid the redundant display of notifications.

Figure 4:
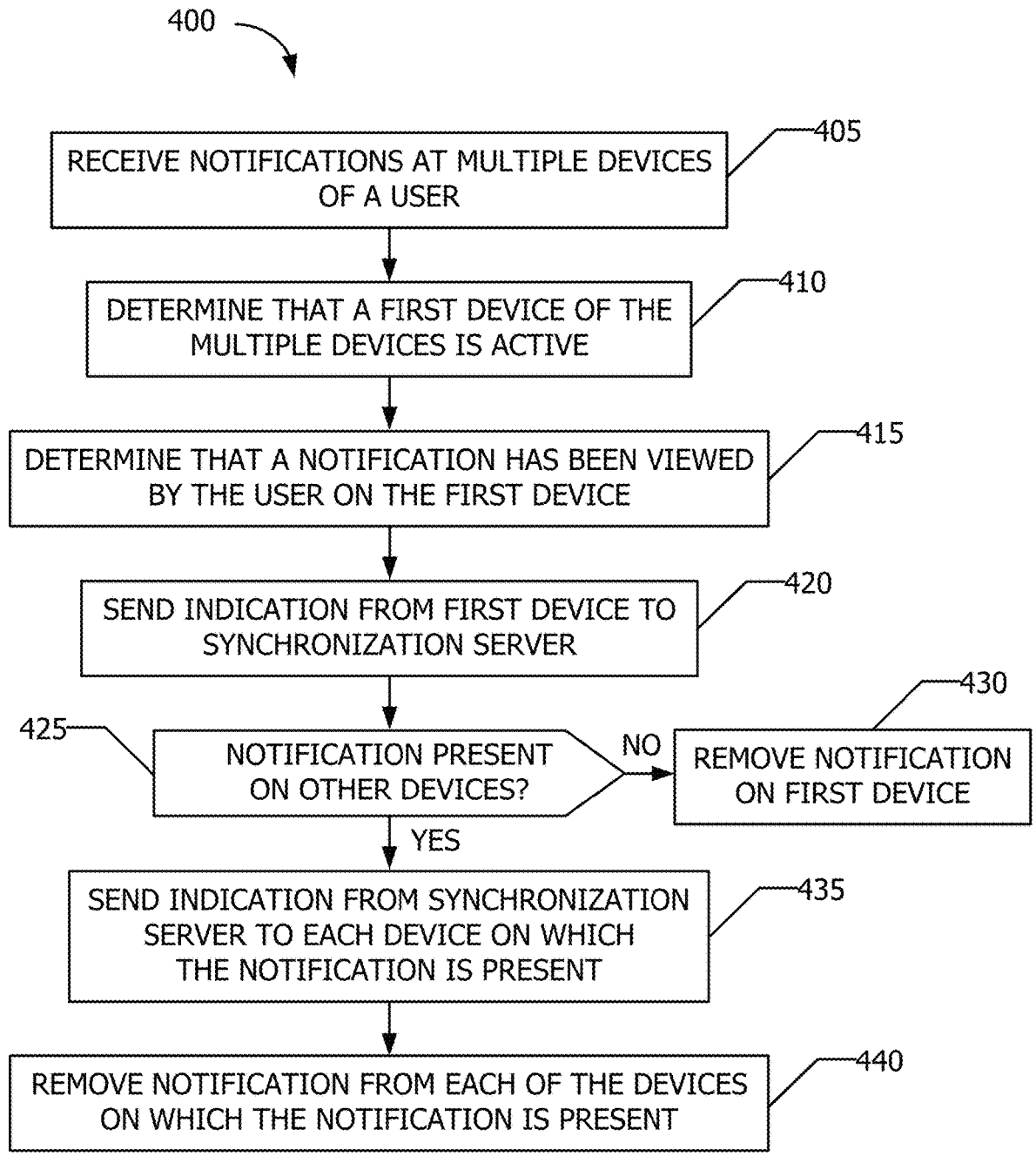
FIG. 4 is a flowchart illustrating an operation by which a redundant display of notifications across multiple user devices may be avoided in accordance with one embodiment.

Referring to FIG. 4, operation 400 illustrates a process by which a redundant display of notifications may be avoided in accordance with one embodiment. As described above, notifications may be received at multiple devices of a single user (block 405). In one embodiment, these notifications may include any type of information that is presented to a user through a common interface. For example, messages from various sources (e.g., various server-side applications) may be compiled into notifications that are presented to a user through a common interface (e.g., an interface of notification service 220). In addition to the example notifications listed above, notifications may include voicemail messages, text messages (e.g., short message service or instant messaging service), stock prices, video messages, etc. As noted above, notifications may be received at the user's devices even when the devices are in an inactive state. Therefore, notifications may accumulate on an inactive device to be displayed when the user activates the device and navigates to an interface through which the notifications may be viewed. Although the notifications received at each of the devices may be different based on the specific settings of the device, there may be some overlap in the notifications received at the devices. Therefore, the same notification may be present on two or more of the devices.

It may be determined that one of the devices is in an active state (block 410). As used herein, a device may be in an active state when a user is actively using the device. The determination of whether a device is in an active state may be made by the device itself and may occur in a variety of different manners. In one embodiment, the device may employ gaze detection to determine the state of the device. In such an embodiment, an image capture component (e.g., a digital camera) that is part of the device may be activated to determine whether a human face is detectable. If so, it may be determined that a user is looking at a display of the device and that the device is therefore in an active state. In another embodiment, device sensors (e.g., a proximity/ambient light sensor, accelerometer and/or gyroscope) may be utilized to detect changes in the orientation of the device (e.g., the positioning of the device). Based on certain orientations or orientation changes, it may be determined that the device is in an active state. In still another embodiment, it may be determined that the device is in an active state based on the transmission and/or receipt of data over a network. While data may be transmitted via a network connection of the device even when the device is in an inactive state, certain data transmission and receipt patterns may indicate that the device is active. For example, while data may be sent and retrieved in short bursts while the device is in an inactive state, the transmission or receipt of data via a network over a more prolonged period or from a certain source/destination may be indicative of an active device. In still another embodiment, a device may be determined to be active based on the user's interaction with the device. For example, the use of a device interface such as a button, keypad, dial, click wheel, keyboard, display screen and/or a touch screen, mouse, trackpad, etc. may indicate that the device is active.

After it is determined that a particular device is active, it may be determined that a notification has been viewed on the active device by a user of the active device (block 415). Determining that a notification has been viewed may also occur in a variety of manners. In one embodiment, it may be determined with a high degree of confidence that a notification has been viewed if the user responds to the notification. For example, if the notification is a text message, it may be determined that the notification has been viewed if the user responds (e.g., by a reply text message) to the sender of the message.

In another embodiment, a notification may be selectable in order to allow the user to interact with the notification. Selection of the notification may cause the client-side application that generated the notification to be launched in order to allow the user to interact with (e.g., respond to or view a video file associated with) the notification. In such an embodiment, selection of the notification may indicate that the notification has been viewed.

In still another embodiment, it may be determined that a notification has been viewed based on the presence of the notification on a display element of the active device. In order to confidently infer that a notification has been read based on the presence of the notification on a display element of the device, it may be required that the notification be present on the display element for a certain time threshold. For example, the presence of a notification on a display element of the device for a certain number of seconds may indicate that the notification has been viewed. In one embodiment, the time threshold may be based on the length of the notification (e.g., the amount of text in a text message notification).

In still another embodiment, the accuracy of the determination that a notification has been viewed based on the presence of the notification on a display element of the device may be improved by combining such method with the above-described gaze detection and/or orientation monitoring process. For example, if it is known that a notification is being displayed on a display element of the device and that a human face is simultaneously detectable via gaze detection, it may be determined with increased confidence that the notification has been viewed on the active device. Likewise, if it is known that a notification is being displayed on a display element of the device and that the device is positioned in a certain orientation (e.g., an orientation that is indicative of a user viewing the display element), it may be determined with increased confidence that the notification has been viewed on the active device.

In yet another embodiment, it may be determined that a notification has been viewed on the active device based on a user's interaction with a user interface of the device in conjunction with the display of the notification on a display element of the device. For example, a certain pattern of scrolling through a series of notifications may be indicative of a user viewing the notifications. For example, if several notifications are present on a device, and the user scrolls through the notifications and pauses when a particular notification is centered on a display element of the device, it may be determined that the notification has been viewed. The above-described mechanisms for determining that a notification has been viewed on a device are provided as examples and are not intended to be limiting in any manner. One of ordinary skill in the art will be aware of additional mechanisms by which it may be determined that a notification has been viewed on a device or by which the confidence in such a determination may be improved.

After it is determined that a notification has been viewed on the device, an indication that the notification has been viewed may be sent to a synchronization server (block 420). As described above, a synchronization server may manage the notifications that are present on each of a user's devices. In one embodiment, the indication may include information to allow the synchronization server to identify devices that are associated with the device on which the notification was viewed. In one embodiment, the indication may include the notification that was determined to have been viewed on the active device. That is, the actual data that constitutes the notification may be sent from the active device to the synchronization server. In another embodiment, an identifier of the notification may be sent from the active device to the synchronization server. As described above with respect to FIG. 3, the identifier may be the result of a hash algorithm performed on the data that constitutes the notification. It should be noted that the indication sent from the active device (block 420) differs from the indication sent from a device to the synchronization server as described in FIG. 3. More specifically, the former indicates that a notification has been viewed on the active device while the latter indicates that a notification is present (but not necessarily viewed) on the device.

Upon receiving indication that a notification has been viewed on one of the user's devices, the synchronization server determines whether the viewed notification is present on other devices. In one embodiment, the notification corresponding to the viewed notification is identified in data store 310. In another embodiment, the notification may be identified in data store 310 using the notification itself or the notification identifier received at 420. Once the notification is identified in data store 310, it may then be determined if the same notification is present on other devices that the user has registered with the synchronization server. As described above with respect to FIG. 3, each of the user's devices may report their notifications to the synchronization server. Therefore, the synchronization server may be aware of the user's devices on which the viewed notification is present. If it is determined that the viewed notification is not present on any of the user's other devices (the "NO" prong of block 425), the viewed notification may simply be removed from the device on which it was viewed (block 430). In one embodiment, removing the notification may refer to removing the notification from an interface in which notifications are displayed. Therefore, the viewed notification may not be removed from the device completely. In one embodiment, removal of the viewed notification may be performed locally when it is determined that the notification has been viewed on the device (block 415). In such an embodiment, if it is determined that the viewed notification is not present on any of the user's other devices (the "NO" prong of block 425) no response from the synchronization server may be necessary. In another embodiment, the notification may not be removed from the notification interface until an instruction to do so is received by the device on which the notification was viewed. In such an embodiment, the synchronization server may send a response to the device on which the notification was viewed indicating that the notification should be removed from the notification interface (block 430).

If it is determined that the viewed notification is present on one or more of the user's other devices (the "YES" prong of block 425), an indication that the notification has been viewed may be sent from the synchronization server to each of the user's devices on which the notification is present (block 435). That is, the synchronization server may push the indication to each of the devices on which the notification is present. Like the indication sent from the device on which the notification was viewed, the indication sent from the synchronization server may include the viewed notification itself or an identifier of the viewed notification. Upon receipt of the indication that a notification has been viewed, each of the receiving devices may identify the viewed notification and may remove the notification from the interface through which such notification is displayed (block 440). Data store 310 may also be updated at the synchronization server to remove the viewed notification from a list of active notifications. Therefore, when it is determined that a notification has been viewed on one of a user's multiple devices, a redundant display of the same notification on one or more of the user's other devices may be avoided.

While the illustrated embodiment describes the identification of each of the user's devices on which the viewed notification is present (block 425), this step is not strictly necessary. In an alternate embodiment, the synchronization server, without regard to the devices on which a notification is present, may simply send an indication that a notification has been viewed to all of the user's registered devices. In such an embodiment, a device receiving such an indication will determine if the viewed notification is present on the device (e.g., is present in an interface through which notifications are displayed). If so, the device can remove the notification as it has been viewed on another device. If not, the device may simply disregard the indication from the synchronization server.

Figure 5A:
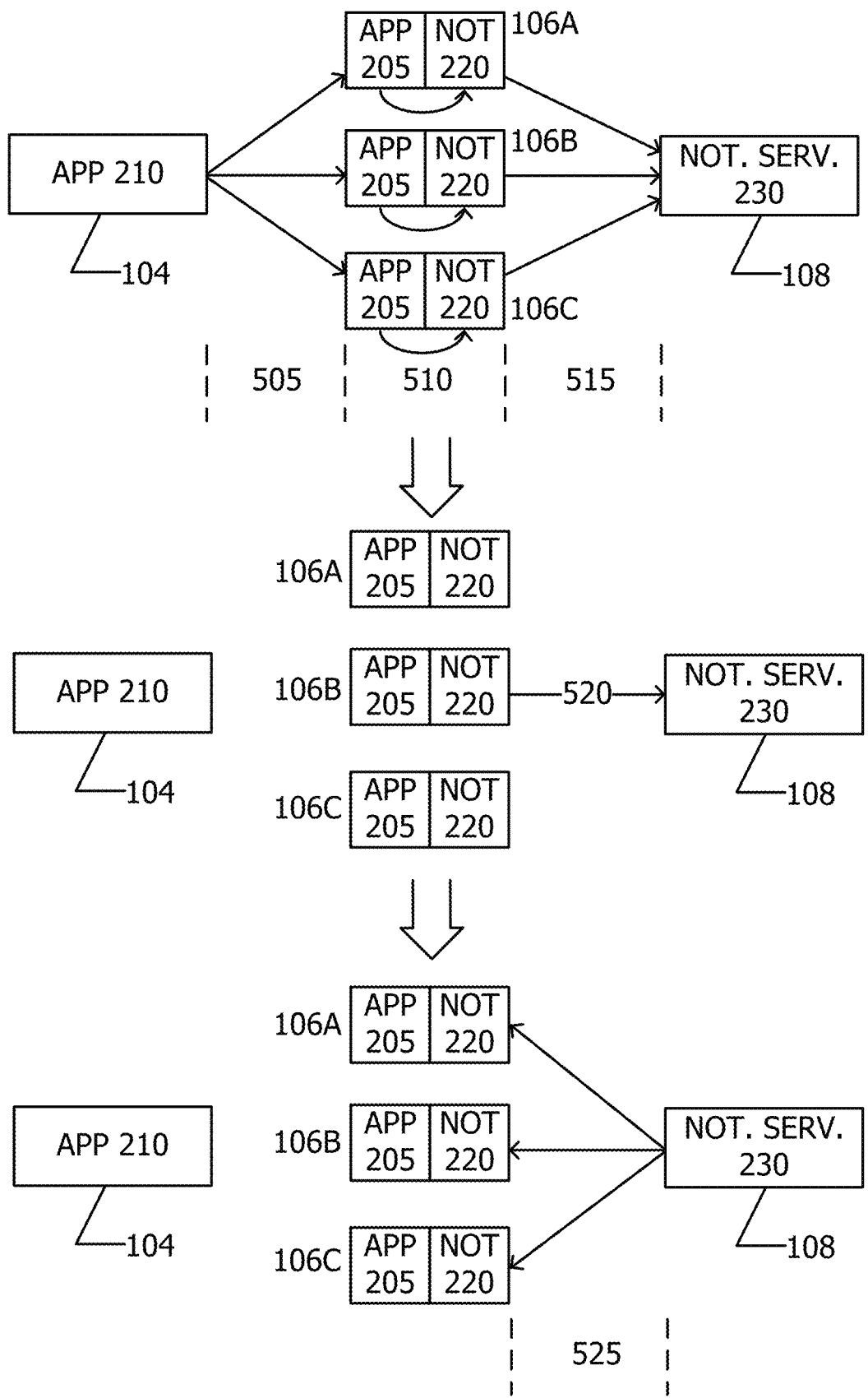
FIGS. 5A, 5B, and 5C illustrate various mechanisms by which a redundant display of a notification on multiple user devices may be avoided in accordance with one or more embodiments.
Figure 5B:
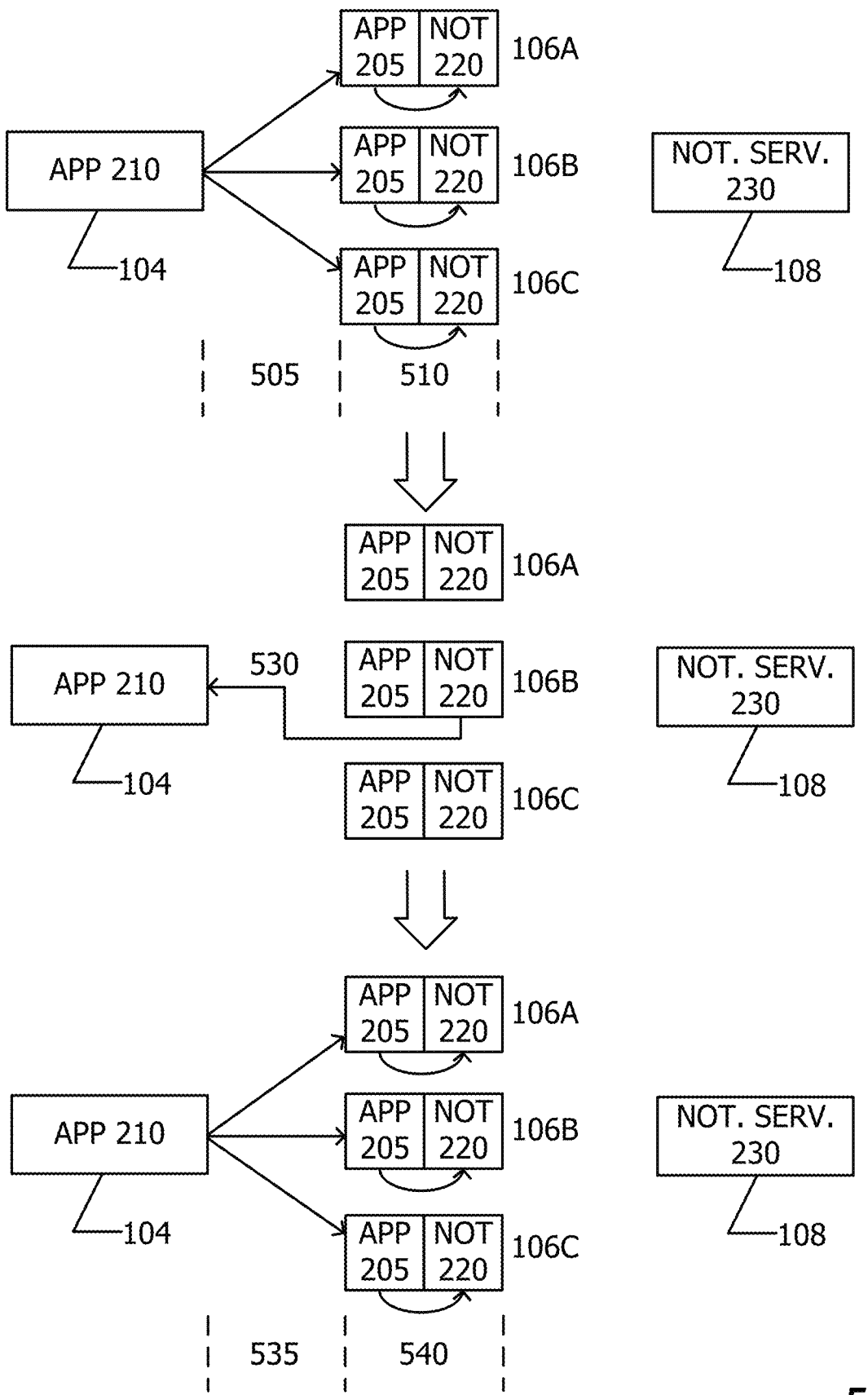
Figure 5C:
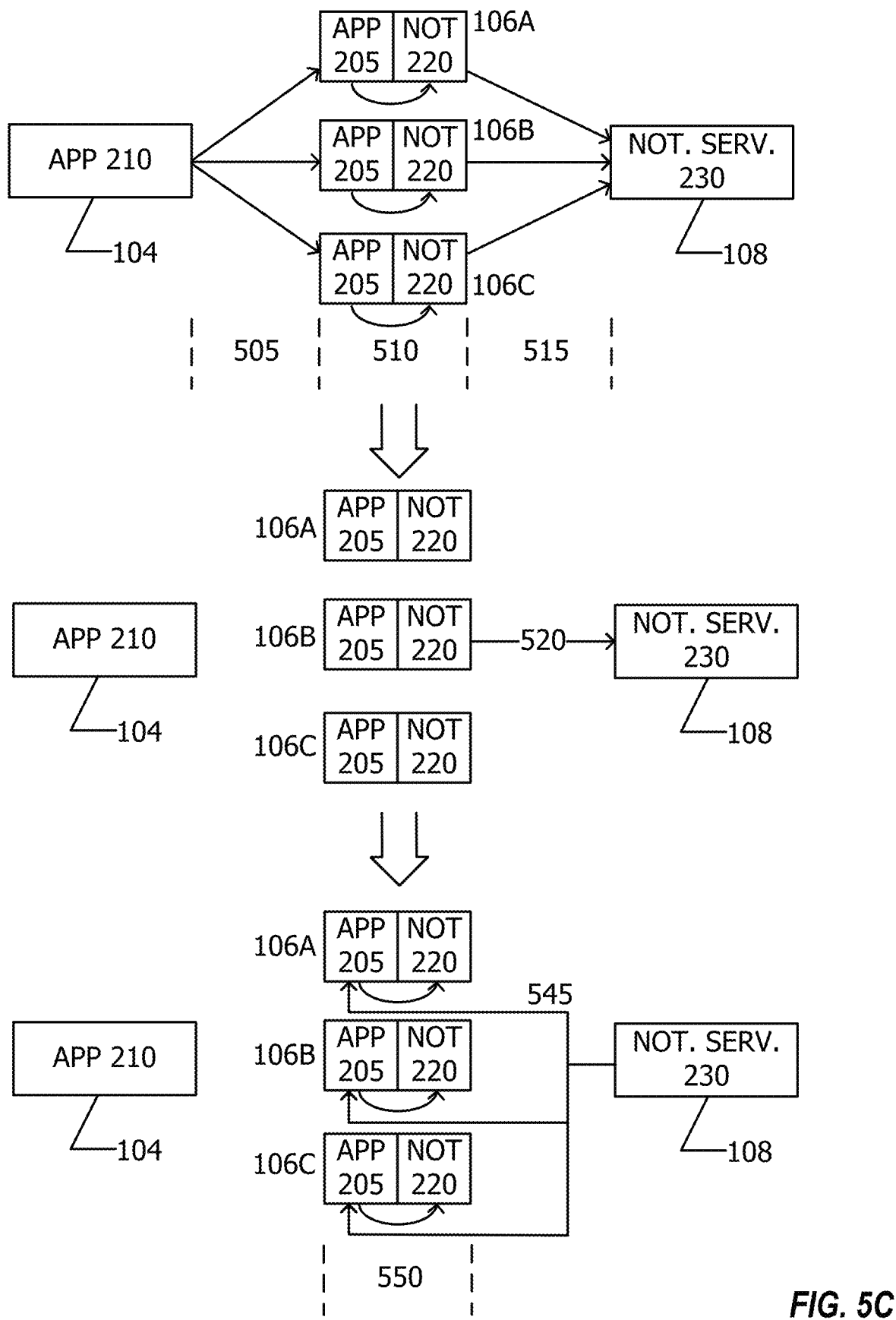

FIGS. 5A through 5C illustrate various mechanisms by which a redundant display of a notification on multiple user devices may be avoided. Referring first to FIG. 5A, client-side application 205 on each of devices 106A-C receives a message from corresponding server-side application 210 executing on data server 104 (505). As described above, client-side application 205 for each of devices 106A-C may be configured to retrieve new information from corresponding server-side application 210 at a certain frequency. Based on predefined settings (e.g., notification settings) on each of devices 106A-C, the information retrieved by client-side application 205 may be passed to client-side notification service 220 to be displayed as a notification on each of devices 106A-C (510). As further described above, the notification may be communicated from client-side notification service 220 to server-side notification service 230 executing on synchronization server 108 (515). Server-side notification service 230 may therefore maintain a record indicating that the notification is present on each of devices 106A-C. Although operations 505, 510, and 515 are grouped together it should be noted that the operations may be specific to each particular device and may occur at different times.

At some point, it may be determined that device 106B is in an active state and that the notification has been viewed on device 106B. Based on the determination that the notification has been viewed on device 106B, an indication that the notification has been viewed may be sent from client-side notification service 220 executing on device 106B to server-side notification service 230 executing on synchronization server 108 (520). In response to the indication that the notification has been viewed on device 106B, server-side notification service 230 may determine that the notification is present on each of devices 106A-C and may send an indication to client-side notification service 220 on each of devices 106A-C that the notification has been viewed (525). While the illustrated embodiment depicts a communication to each of the devices on which the notification is present, in an alternate embodiment, the indication may not be sent to device 106B because device 106B is already aware of the viewing of the notification. The notification may therefore be removed from a notification interface of client-side notification service 220 for each of the devices on which the notification is present to avoid a redundant display of the notification on multiple devices.

In an alternate embodiment illustrated in FIG. 5B, information retrieved by client-side application 205 may result in the generation of a notification at each of devices 106A-C in the same manner as described with respect to FIG. 5A. In the embodiment illustrated in FIG. 5B, however, client-side notification service 220 may not communicate the presence of the notification to server-side synchronization service 230 executing on synchronization server 108. In fact, although synchronization server 108 is illustrated for purposes of comparison, it may not be utilized in the embodiment of FIG. 5B.

In the same manner as described above, it may be determined that device 106B is in an active state and that the notification has been viewed on device 106B. However, rather than transmitting the indication that the notification has been viewed to synchronization server 108, client-side notification service 220 transmits the notification to server-side application 210 that is responsible for the generation of the notification (530) (i.e., the server-side application from which the information that resulted in the notification was retrieved). Although client-side notification service 220 is illustrated as communicating the indication directly to server-side application 210, the indication may actually be relayed to server-side application 210 through client-side application 205. In one embodiment, the indication may contain information (e.g., credentials) that identify a user's account with the server-side application. In such an embodiment, the user account may be used to maintain a record of the user devices (e.g., 106A-C) that are associated with the account. In one embodiment, the indication may include the notification or an identifier of the notification to allow server-side application 210 to identify the message that corresponds to the viewed notification.

In response to receiving the indication, server-side application 210 may send an indication to each of client-side applications 205 on each of devices 106A-C that the notification has been viewed (535). In one embodiment, the indication that the notification has been viewed may be pushed to each of devices 106A-C. In another embodiment, the indication may be communicated to each of devices 106A-C when client-side application 205 retrieves information from the server-side application (e.g., according to a certain update schedule). The indication may then be passed from client-side application 205 for each of devices 106A-C to client-side notification service 220 for each of devices 106A-C (540) to cause client-side notification service 220 to remove the notification and avoid a redundant display of the notification on multiple devices.

In the embodiment of FIG. 5B, server-side application 210 may function in a similar manner as server-side notification service 230 in that it may maintain a record of the devices associated with a particular user (or a particular user account). For example, each instance of client-side application 205 may register with server-side application 210 to communicate information associated with the application. Therefore, server-side application 210 may have a listing of the client-side applications (and corresponding devices) that are associated with a user's account. It should be noted, however, that while server-side notification service 230 may manage notifications for multiple sources (i.e., notifications that originated as information retrieved from multiple server-side applications) server-side application 210 of the embodiment illustrated in FIG. 5B may manage only those notifications that were generated based on information that it provided. Therefore, server-side notification service 230 may be described as a global notification manager while server-side application 210 of FIG. 5B may be described as an application-specific notification manager.

In yet another embodiment illustrated in FIG. 5C, information may be received (505), a notification generated (510), the presence of the notification communicated (515), and an indication that the notification has been viewed communicated (520) in the same manner as described in FIG. 5A. However, in response to the indication that the notification has been viewed, server-side notification service 230 may send an indication to client-side application 205 that caused the notification to be generated rather than directly to client-side notification service 220 (545). Client-side application 205 for each of devices 106A-C may then cause the notification to be removed from notification service 220 (550). Therefore, rather than communicating the indication that the notification has been viewed directly to client-side notification service 220, the indication may be communicated to the application that caused the notification to be generated (i.e. client-side application 205) such that the application can cause the notification to be removed. The embodiments of FIGS. 5A-5C illustrate different mechanisms of achieving the common goal of avoiding a redundant display of a notification on multiple devices.

Figure 6:
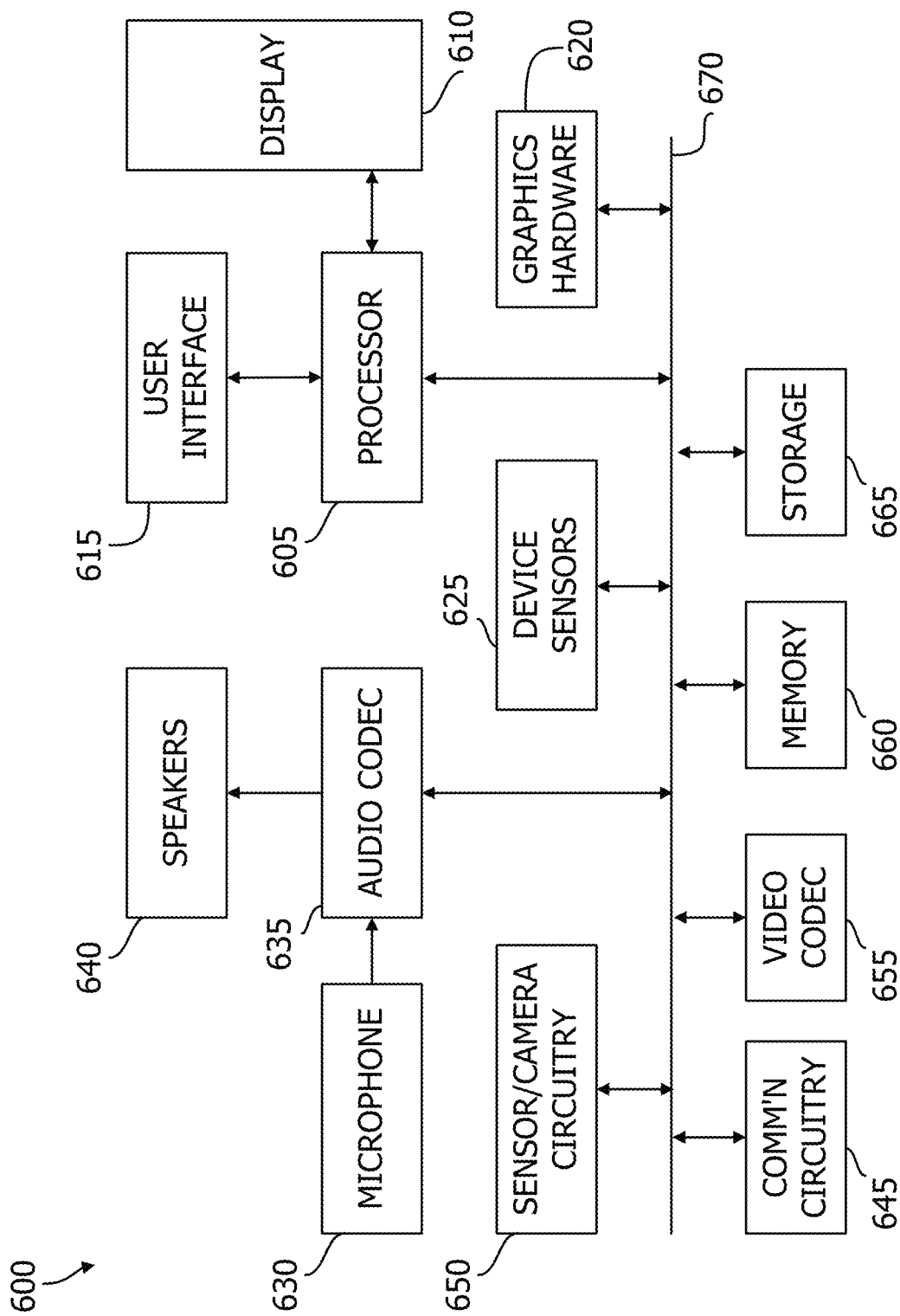
FIG. 6 is a block diagram illustrating an electronic device in accordance with one embodiment.

Referring to FIG. 6, a simplified functional block diagram of an illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a personal digital assistant (PDA), personal music player, mobile telephone, notebook, laptop or a tablet computer system, a desktop computer system, or server computer system. More particularly, any of devices 106, data servers 104, and synchronization server 108 may take the form of electronic device 600.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by at least one processor and comprising instructions for an application executable by the at least one processor, wherein the instructions cause the at least one processor to:
   receive over a network a plurality of messages from a computer system, wherein the computer system contains an updated record of which notifications are present on which of a plurality of associated devices based on the plurality of messages;
   add a first notification to a common interface based on a first message of the plurality of messages;
   add a second notification to the common interface based on a second message of the plurality of messages;
   receive over the network an indication from the computer system that the first notification has been viewed using at least one other of the plurality of associated devices; and
   based on the indication from the computer system, remove the first notification from the common interface in accordance with the record of which notifications are present on which of the plurality of associated devices based on the plurality of messages.

2. The non-transitory program storage device of claim 1, wherein the instructions for the application are further executable to cause the at least one processor to:
   determine that the second notification has been viewed; and
   initiate transmission of an indication that the second notification has been viewed in response to the determination.

3. The non-transitory program storage device of claim 2, wherein the instructions for the application cause the at least one processor to determine that the second notification has been viewed are executable to determine that the second notification has been viewed based on detecting a reply to the second notification.

4. The non-transitory program storage device of claim 3, wherein the reply comprises a text message.

5. The non-transitory program storage device of claim 2, wherein the instructions for the application cause the at least one processor to determine that the second notification has been viewed are executable to determine that the second notification has been viewed based on detecting an interaction with the second notification.

6. The non-transitory program storage device of claim 5, wherein the interaction comprises launch of a file associated with the second notification.

7. The non-transitory program storage device of claim 2, wherein the instructions for the application cause the at least one processor to determine that the second notification has been viewed are executable to determine that the second notification has been viewed based on an amount of time since the notification was added to the common interface is greater than a threshold period of time.

8. The non-transitory program storage device of claim 2, wherein the instructions for the application cause the at least one processor to determine that the second notification has been viewed cause the processor to determine that the second notification has been viewed based on detecting that a gaze of user was directed at the common interface while the second notification was added to the common interface.

9. A method comprising:
receiving over a network a plurality of messages for an application from a computer system associated with the application, wherein the computer system contains an updated record of which notifications are present on which of a plurality of associated devices based on the plurality of messages;
adding a first notification to a common interface based on a first message of the plurality of messages;
adding a second notification to the common interface based on a second message of the plurality of messages;
receiving, over the network an indication from the computer system that the first notification has been viewed using at least one other of the plurality of associated devices; and
based on the indication from the computer system, removing the first notification from the common interface in accordance with the record of which notifications are present on which of the plurality of associated devices based on the plurality of messages.

10. The method of claim 9, further comprising:
determining that the second notification has been viewed; and
initiating transmission of an indication that the second notification has been viewed in response to the determination.

11. The method of claim 10, wherein determining that the second notification has been viewed includes determining that the second notification has been viewed based on detecting a reply to the second notification.

12. The method of claim 11, wherein the reply comprises a text message.

13. The method of claim 10, wherein determining that the second notification has been viewed comprises determining that the second notification has been viewed based on detecting an interaction with the second notification.

14. The method of claim 13, wherein the interaction comprises launching of a file associated with the second notification.

15. The method of claim 10, wherein determining that the second notification has been viewed comprises determining that the second notification has been viewed based on an amount of time since the notification was added to the common interface is greater than a threshold period of time.

16. A computer system comprising:
one or more processors; and
one or more memory devices storing instructions executable by the one or more processors to:
transmit over a network, to a first device of a plurality of associated devices, a plurality of messages associated with an application, wherein the computer system tracks which notifications are presented on devices of a plurality of associated devices based on the plurality of messages transmitted;
transmit over the network, to a second device of the plurality of associated devices, the plurality of messages associated with the application;
receive, from the second device, an indication that a first message has been viewed;
transmit over the network, to the first device, an indication that the first message has been viewed to cause the application to remove a first notification associated with the first message and in accordance with a record of which notifications are present on which of the plurality of associated devices based on the plurality of messages.

17. The computer system of claim 16, wherein the plurality of associated devices are associated with a user account.

18. The computer system of claim 16, wherein the synchronization server computer system maintains a record of messages received by the plurality of associated devices to track which notifications are presented by devices of the plurality of associated devices.

19. The computer system of claim 16, wherein the instructions further cause the one or more processors to receive, over the network, a reply to the first message, wherein the indication that the first message has been viewed comprises the reply.

20. The computer system of claim 19, wherein the reply comprises a text message.

* * * * *